United States Patent
Colling et al.

[11] Patent Number: 5,334,095
[45] Date of Patent: Aug. 2, 1994

[54] ROTARY COUPLER WITH SHAFT MISALIGNMENT AND OVERTRAVEL TOLERANCE

[76] Inventors: George J. Colling, 199 Maple La., Jordan, Minn. 55352; Dale A. Mueller, 15215 N. 67th Ave., Maple Grove, Minn. 55311

[21] Appl. No.: 127,673

[22] Filed: Sep. 28, 1993

Related U.S. Application Data

[63] Continuation-in-part of Ser. No. 998,199, Dec. 30, 1992, abandoned.

[51] Int. Cl.$^5$ .................. F16D 3/78; F16D 1/02; F16B 21/14; F16B 21/18
[52] U.S. Cl. .................. 464/101; 403/220; 403/294; 411/352; 411/514; 411/515
[58] Field of Search .................. 464/100, 101, 141; 403/220, 291, 292, 294; 411/514, 515, 352; 24/563

[56] References Cited

U.S. PATENT DOCUMENTS

| | | | |
|---|---|---|---|
| 181,514 | 8/1876 | York | 464/100 X |
| 466,634 | 1/1892 | Stofer | 411/514 X |
| 1,712,219 | 5/1929 | Knudsen | 464/100 |
| 2,724,251 | 11/1955 | Weaver | 464/101 |
| 4,466,763 | 8/1984 | Fischer | 411/352 X |
| 4,527,986 | 7/1985 | Bridgewater et al. | 464/101 X |

FOREIGN PATENT DOCUMENTS

2089475  1/1982  United Kingdom ............. 403/294

OTHER PUBLICATIONS

Honeywell Inc., Product Manual for D80B, Automatic Vent Damper, Form No. 60-2523-8, pp. 1-3, 11, 12 and 29 (Rev. 11-92).
Honeywell Inc., Product Manual for D892 Automatic Vent Damper, Form No. 69-0744B-1 (Rev. 3-93).

*Primary Examiner*—Clifford D. Crowder
*Assistant Examiner*—John J. Calvert
*Attorney, Agent, or Firm*—Charles L. Rubow

[57] ABSTRACT

A mechanical rotary coupler for first and second coral shafts having slotted ends proximate one another, the coupler being formed of an elongated blade of resilient material longitudinally slit and folded on itself transverse to the slit to provide first and second resilient V-shaped strips connected by bridging portions at the ends of the blade, the strips respectively being adapted to engage the slots in the ends of the first and second shafts at regions on the strips spaced from the bridging portions.

13 Claims, 4 Drawing Sheets

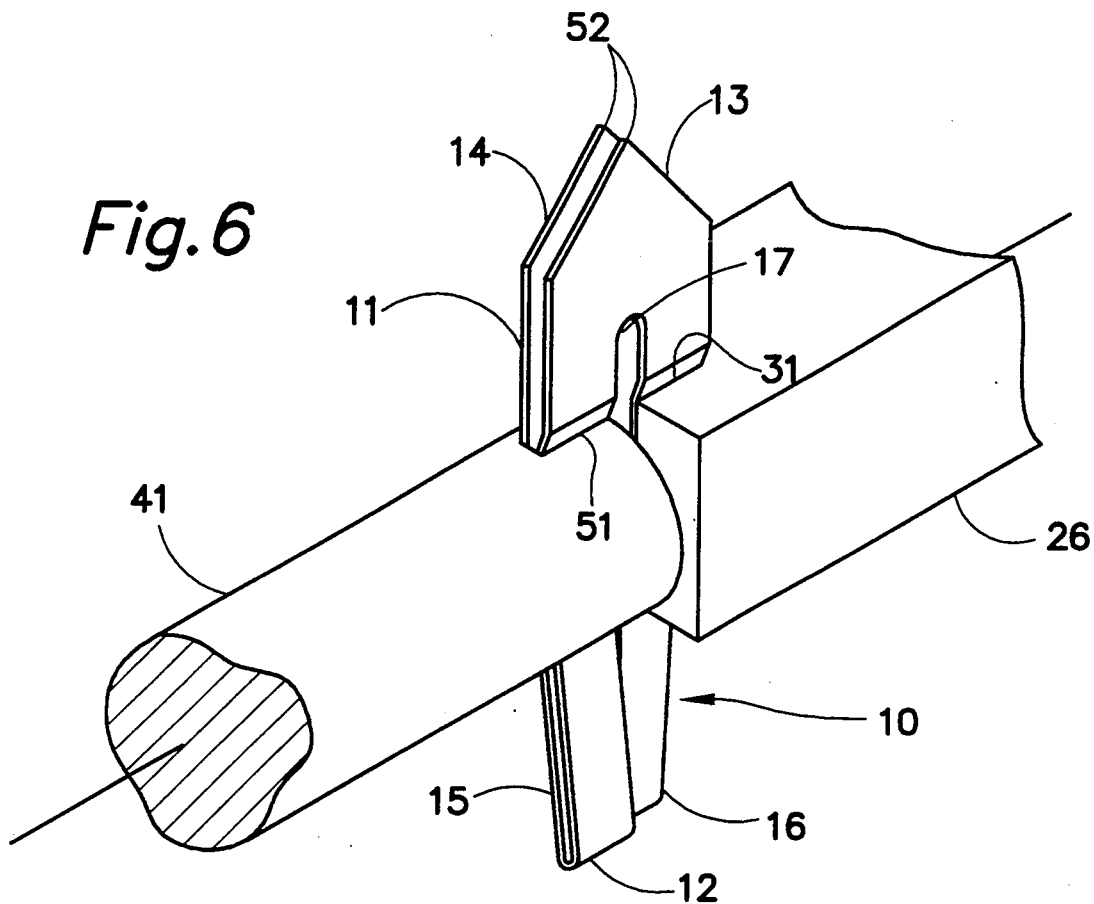

ROTARY COUPLER WITH SHAFT MISALIGNMENT AND OVERTRAVEL TOLERANCE

This application is a continuation-in-part of pending U.S. patent application Ser. No. 07/998,199 filed Dec. 30, 1992, abandoned, in the name of George J. Colling.

BACKGROUND OF THE INVENTION

The invention disclosed herein relates generally to mechanical couplers for rotatable shafts, and more particularly to such couplers of a design which can be simply formed of inexpensive sheet material in a configuration which tolerates shaft misalignment and permits limited overtravel of one shaft relative to another.

Coupler devices of wide variety of designs for generally aligned rotatable shafts are well known. These designs range from simple solid couplers which rigidly connect one shaft to another end to end, to couplers employing a variety of resilient elements for permitting limited relative motion and/or misalignment between the coupled shafts.

One common resilient coupler design type employs a pair of flanges or hubs rigidly fixed to adjacent ends of the shafts, the flanges or hubs being connected to one another through elastomeric material, springs or a functional equivalent. In such an arrangement, the coupler is normally formed of a plurality of parts, some of which may be most advantageously formed by machining or casting. The number and form of the component parts results in a coupler which is relatively complex and expensive.

It is known to simplify this arrangement by appropriately configuring the spring and ends of the shafts so as to eliminate the flanges or hubs. A particular implementation may effectively involve a cylindrical coil spring aligned with the axis of the shafts and connected at opposite ends thereof to the separate shafts. However, the obvious ways of connecting the spring to the shafts in such an implementation either require special forming which may be disadvantageous for production, or are difficult to assemble and disassemble, or do not provide reliable attachment which is adequately free of backlash, or have some other associated disadvantage.

Although existing rotary coupler designs are satisfactory for many applications, a continuing need exists for simpler, less expensive couplers which are adaptable to a variety of applications, and exhibit characteristics such as freedom from backlash, tolerance of shaft misalignment and overtravel of one shaft relative to the other, accommodation of shafts of unequal sizes, simple single piece construction capable of inexpensive and easy manufacture, etc.

SUMMARY OF THE INVENTION

The present invention is a coupler for rotational coupling of first and second generally coaxial shafts and a mechanical system employing the coupler for transmitting torque between the shafts, each shaft having a slotted end proximate the slotted end of the other shaft. The coupler is in the form of an elongated blade of resilient material divided by a longitudinal slit into first and second strips connected together by at least one bridging portion of the blade, the blade being folded on itself along a line transverse to the slit so that the strips are each formed into a V-shape, the strips further being formed into a shaft retaining configuration in a region spaced from the bridging portion.

The coupler thus formed, is of single piece construction, of simple, easily and inexpensively manufactured design, and of a design which provides desirable characteristics for many applications.

BRIEF DESCRIPTION OF THE DRAWINGS

FIG. 6 is an enlarged partial view of the rotationally coupled shafts of the vent damper of FIG. 5 with the closure member in a one limiting position.

FIG. 7 is an enlarged partial view of the coupled shafts of the vent damper of FIG. 5 with the closure member in its limiting position opposite to that shown in FIG. 6.

DESCRIPTION OF THE PREFERRED EMBODIMENTS

Figure 1:
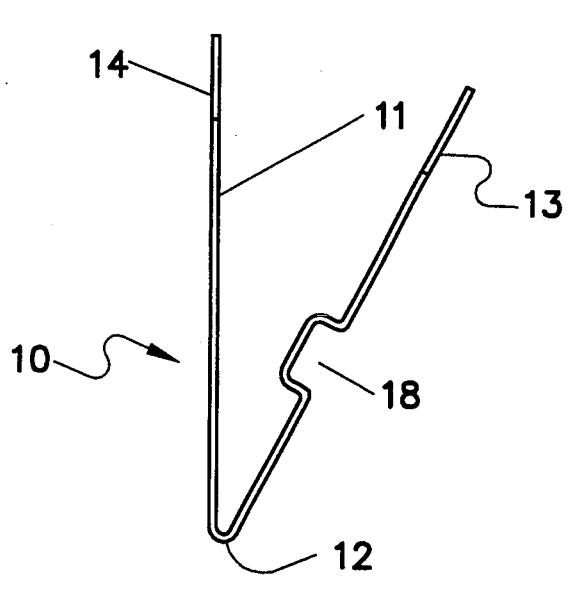
FIG. 1 is an edge view of one embodiment of a rotary mechanical coupler in accordance with the applicants' design.
Figure 2:
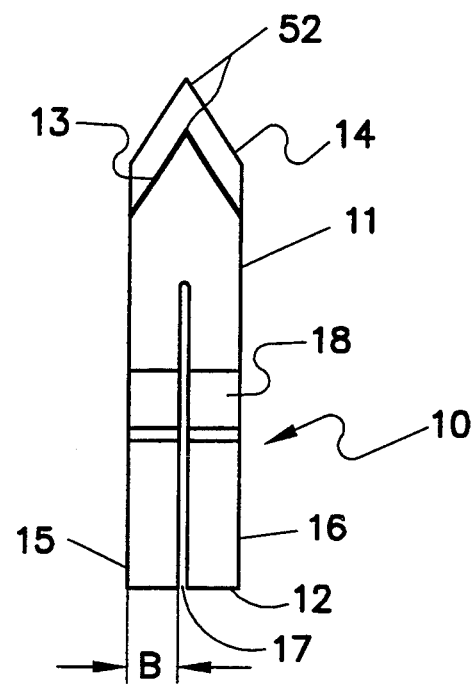
FIG. 2 is a frontal view of the rotary mechanical coupler of FIG. 1.
Figure 3:
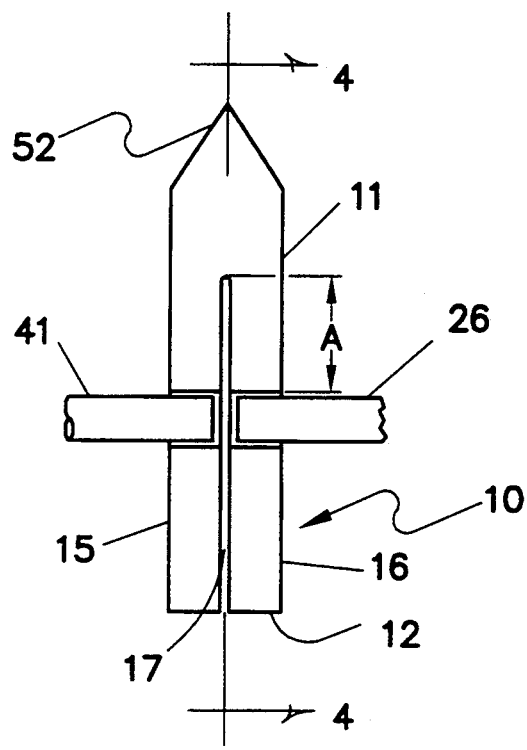
FIG. 3 illustrates an assembly of two coaxial shafts rotationally coupled by means of the coupler of FIGS. 1 and 2.
Figure 4:
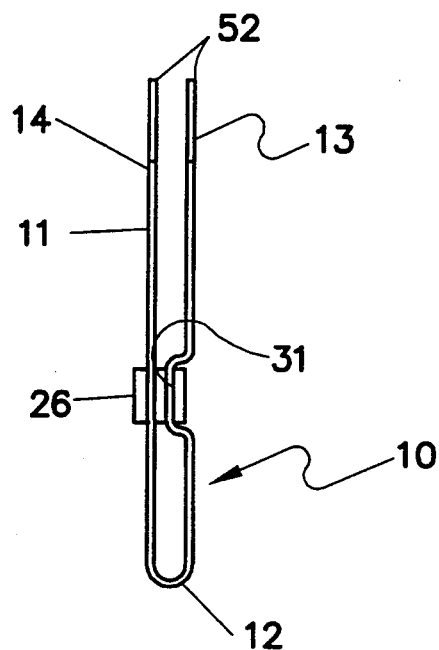
FIG. 4 is a sectional view of the assembly of FIG. 3 taken along lines 4—4.

Reference numeral 10 in FIGS. 1-7 generally identifies one embodiment of a rotary mechanical coupler in accordance with the applicants' invention. Coupler 10 is formed of an elongated blade 11 of resilient sheet material. Stainless steel has found to be a suitable material for a particular application for which the coupler was designed. Blade 11 is folded on itself along a fold line 12 intermediate first and second ends 13 and 14 of the blade as shown in FIGS. 1 and 4. Fold line 12 is shown as perpendicular to the length of elongated blade 11.

Elongated blade 11 is also divided into first and second strips 15 and 16 as shown in FIGS. 2, 3, 6 and 7 by means of a longitudinal slit 17. In this embodiment, strips 15 and 16 are connected together by bridging portions of blade 11 in the regions of its ends 13 and 14 beyond the ends of slit 17. Thus, each of first and second strips 15 and 16 is of a V configuration, with first and second segments of the V configuration generally lying in intersecting planes, and extending from a bight at fold line 12 to the first and second ends 13 and 14 respectively.

A region of first and second strips 15 and 16 between fold line 12 and first end 13 is displaced from the plane of that segment of the blade 11 to form a channel 18 transverse to the strips. Channel 18 provides a shaft retaining function, with the edges of the channel engaging the sides of shafts coupled by coupler 10 to retain the coupler in position on the shafts. The width of the channel is substantially equal to but not less than the cross-sectional dimension of the shafts to be coupled.

Figure 5:
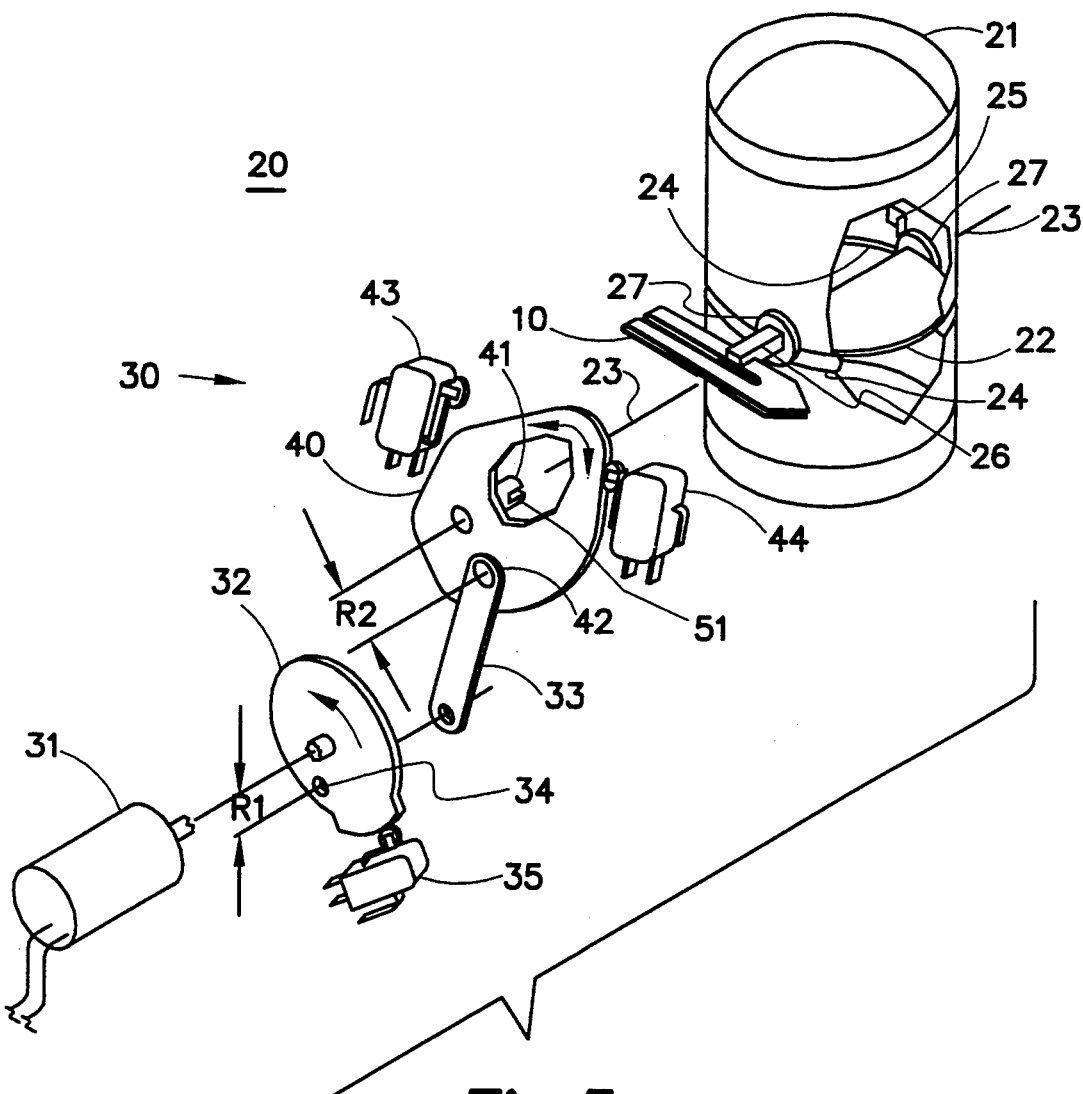
FIG. 5 is an exploded representation, partially broken away, of automatic vent damper apparatus in which a rotary coupler of the design illustrated in FIGS. 1-4 has been found particularly advantageous.
Figure 8:
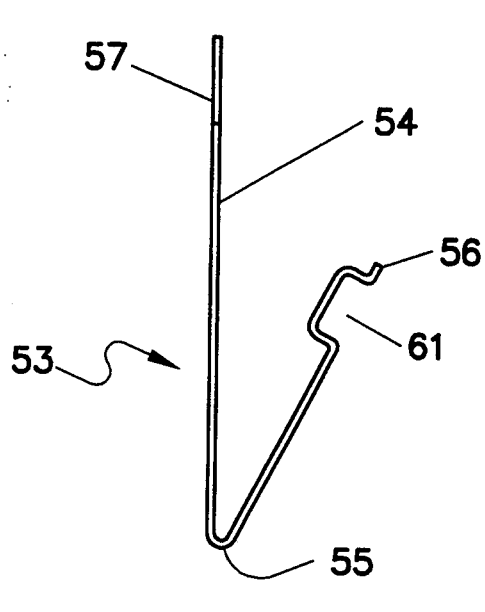
FIG. 8 is an edge view of an alternative embodiment of a rotary mechanical coupler in accordance with the applicants' design.

The application for which coupler 10 was specifically designed, and one for which it has been found particularly suitable, is automatic vent damper apparatus, as illustrated in FIG. 5, in which it is generally identified by reference numeral 20. Vent damper 20 is intended to be part of a flue system for venting combustion gases from a furnace which operates under thermostatic control. Vent damper 20 includes a tubular flue section 21 having a generally planar closure disk 22 therein mounted for rotation about an axis 23 between a closed position as shown in FIG. 5 and an open position in which closure disk 22 is rotated 90° from the position shown in FIG. 5. The purpose of vent damper 20 is to permit substantially unimpeded flow of combustion gases when the furnace is in operation, while substantially completely precluding flow, except for any flow which may be required for operation of a standing pilot, when the furnace in not in operation. Closure of the flue when the furnace is not in operation prevents heat from escaping from the space heated by the furnace, thereby resulting in substantial fuel savings.

Various vent damper arrangements are known. In one common vent damper system design, a closure member is mounted to rotate in one direction to a closed limiting position against a perimeter seal in a flue section, and to rotate 90° in the opposite direction to an open position. The closure member is biased to its open position by a return spring whose force is overcome by an electric motor to close the member when the furnace in not in operation. The motor is designed to be continuously powered in a stalled state to maintain closure of the vent. Such a design does not require overtravel of the motor shaft with respect to the closure member shaft. Therefore, a coupling which is rotationally rigid may be employed. This design requires robust components, including a motor adapted to be continuously powered in a stalled state.

Another known vent damper arrangement employs a closure member which rotates in a single direction in 90° steps to achieve alternate opening and closing of the flue. A disadvantage of such an arrangement is that, for normal dimensional tolerances of sheet metal parts, the closure member does not provide a tight seal, and thus permits significant leakage when closed. If a tighter seal is required, alternative construction, which is generally more complex and expensive, would be necessary.

In the arrangement shown in FIG. 5, closure disk 22 alternately rotates in opposite directions between its open and closed positions. In its closed position, the periphery of closure disk 22 comes to rest against a perimeter stop ridge 24 formed in the wall of flue section 21, which functions as a seal within the flue section. This arrangement provides good control of leakage, without requiring dimensional tolerances which are uncommonly tight for sheet metal construction.

In its open position, closure disk 22 comes to rest against a stop 25. Stop ridge 24 and stop 25 provide fixed limiting positions 90° apart for closure disk 22. In order to achieve optimum performance, closure disk 22 must be rotated to rest firmly against stop ridge 24 or stop 25.

Closure disk 22 is mounted on a shaft 26 aligned with axis 23 and rotatably carried in the wall of flue section 21 by means of bushings 27. As more clearly illustrated in FIGS. 4, 6 and 7, shaft 26 is square in cross-section to facilitate attachment of two halves of closure disk 22 in offset parallel planes. The end of shaft 26 to which an actuator mechanism generally identified by reference numeral 30 is mechanically coupled, is bisected by a slot 31.

It would, of course, be possible to use a reversible motor for rotating closure disk 22 between stop ridge 24 and stop 25. However, reversible motors with attendant power supplies and control systems for achieving reversing operation are undesirably complex and expensive for applications such as the vent damper of FIG. 5. Accordingly, actuator 30 employs a unidirectional electric motor 31 which is energized by a control circuit when opening or closing of closure disk 22 is desired. The output shaft of motor 31 carries a disk-shaped member 32 having a link 33, of which one end is pivotally connected to member 32 at a pivot point 34 located at a distance $R_1$ from the axis of the output shaft. Thus, member 32 and link 33 form a crank arrangement. The periphery of member 32 is configured to form a cam for actuating an electrical switch 35 which may be used to provide redundant safety in controlling a gas fuel valve in the furnace.

A member 40 is carried on a stub shaft 41 mounted for rotation about axis 23. Stub shaft 41 has a slotted end 51 thereon facing the slotted end of shaft 26 for engaging coupler 10. Member 40 is also pivotally connected to link 33 at the end of the link opposite that pivotally connected to member 32. Pivot point 42 at which link 33 is connected to member 40 is at a distance $R_2$ from axis 23, $R_2$ being greater than $R_1$, so that as member 32 rotates through a complete revolution, member 40 oscillates between two positional limits determined by the relative magnitudes of distances $R_1$ and $R_2$. For purposes of the illustrated vent damper, the magnitudes of distances are $R_1$ and $R_2$ are chosen so that member 40 oscillates through slightly greater than 90°.

The periphery of member 40 is configured with a lobe for actuating electrical limit switches 43 and 44 respectively when member 40 is at its opposite positional limits. Limit switches 43 and 44 serve to interrupt energization of motor 31, as described in detail in U.S. patent application Ser. No. 07/998,201 filed Dec. 30, 1992 in the name of George J. Colling, when member 40 is rotated to either of its positional limits.

As illustrated in FIGS. 3, 4, 6 and 7, shafts 26 and 41 are rotationally coupled by means of coupler 10 which engages slot 31 in the end of shaft 26 and corresponding slot 51 in the end of shaft 41. Slots 31 and 51 have a width slightly greater than twice the thickness of the material from which blade 11 is formed. Coupler 10 is installed by compressing the portions of V-shaped strips 15 and 16 so that the strips can be inserted into slots 51 and 31 respectively. Since the segments of each V-shaped strip are urged apart by the resilience of the material, coupler 10 provides backlash free coupling of shafts 26 and 41. Further, with coupler 10 in place in slots 31 and 51, the edges of channel 18 engage the outer surfaces of the shafts at the edges of the slots to retain coupler 10 in the slots.

Coupler 10 also serves to permit limited overtravel of shaft 41 with respect to shaft 26, as illustrated in FIGS. 6 and 7. Because of the configuration of coupler 10, strips 15 and 16 are permitted to flex with respect to one another. The stiffness of this flexure is determined by the properties and thickness of the material of blade 11, the distance between the ends of slot 17 and the edges of shafts 26 and 41 as represented by dimension A in FIG. 3 and the width of strips 15 and 16 as represented by dimension B in FIG. 2. Thus, the torque transmitted during overtravel of shaft 41 can be easily controlled by properly selecting dimensions A and/or B.

Coupler 10 is also configured to provide a ready indication of the rotational positions of shafts 26 and 41, and thus of the position of closure disk 22 within flue section 21. In particular, ends 13 and 14 of blade 11 are shown shaped as pointers 52 to clearly indicate the rotational position of closure disk 22. Although a pointer configuration is illustrated, ends 13 and 14 of blade 11 may be readily configured in any of a variety of shapes suitable for any particular application.

In FIGS. 8-11, reference numeral 53 generally identifies an alternative embodiment of the applicants' rotary mechanical coupler. This embodiment is generally similar to the embodiment illustrated in FIGS. 1-7, except that the strips which engage the coaxial shafts are connected together at one end only. With particular reference to FIGS. 8-11, reference numeral 54 identifies an elongated blade of resilient sheet material, such as stainless steel. Blade 54 is folded on itself along a fold line 55 intermediate first and second ends 56 and 57 of blade 54.

Figure 9:
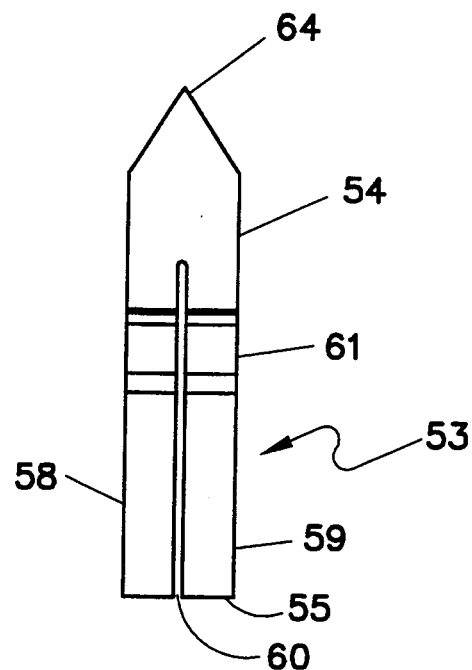
FIG. 9 is a frontal view of the rotary mechanical coupler of FIG. 8.
Figure 10:
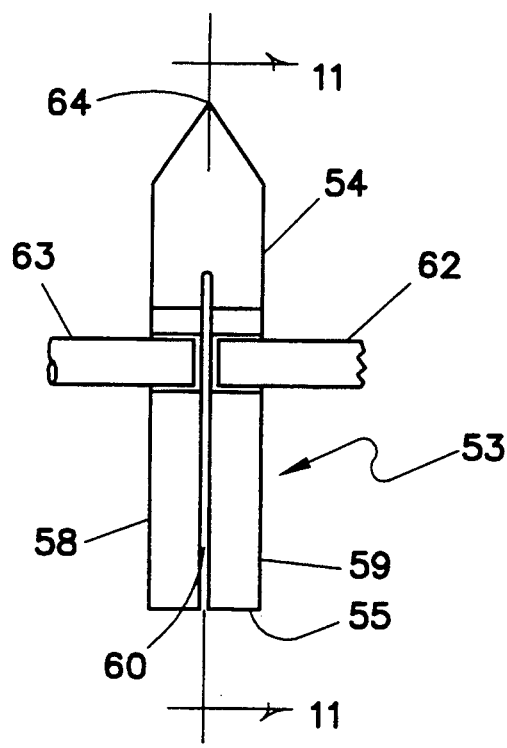
FIG. 10 illustrates an assembly of two coaxial shafts rotationally coupled by means of the coupler of FIGS. 8 and 9.

Blade 54 is divided into first and second strips 58 and 59, as shown in FIGS. 9 and 10, by means of a longitudinal slit 60. Strips 58 and 59 are connected together by a bridging portion of blade 54 in the region of second end 57 only.

A region of first and second strips 58 and 59 between fold line 55 and first end 56 is displaced from the plane of that segment of the strips to form a channel 61 transverse to blade 54. Channel 61 is adapted to retain coupler 53 in position as described for channel 18 in the coupler embodiment of FIGS. 1-4.

Figure 11:
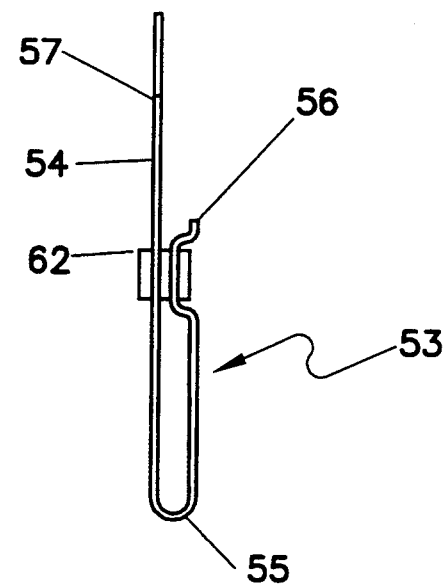
FIG. 11 is a sectional view of the assembly of FIG. 10 taken along lines 11—11 in FIG. 10.

FIGS. 10 and 11 illustrate a pair of coaxial shafts 62 and 63, corresponding to shafts 26 and 41 respectively of FIGS. 3-7, rotationally coupled through coupler 53. Coupler 53 also serve to visually indicate the rotational position of shafts 62 and 63 by means of a pointer 64 formed on second end 57 of blade 54.

As shown and described in detail, the applicants have provided a unique, simple, low cost rotary mechanical coupler which is highly adaptable and provides a number of advantageous characteristics. Although two particular embodiments have been shown and described in detail for illustrative purposes, it is not intended that coverage be limited to these embodiments, but only by the terms of the following claims.

The embodiments of the invention in which an exclusive property or right is claimed are defined as follows:

1. A mechanical coupler for rotational coupling of first and second coaxial shafts, each shaft having a slotted end proximate the slotted end of the other shaft, comprising:
    an elongated blade of resilient material having first and second ends, said blade being divided by a longitudinal slit into first and second strips connected together by bridging means, said blade further being folded into a V-shape having first and second segments which extend from an intermediate bight to the first and second ends of said blade respectively, a least the first segment having a shaft engaging region spaced from the bridging means and formed to engage shafts to be coupled so as to be retained in a predetermined position relative thereto.

2. The mechanical coupler of claim 1 wherein the longitudinal slit extends in opposite directions from the shaft engaging region.

3. The mechanical coupler of claim 2 wherein the bridging means comprises first and second bridging portions at the first and second ends respectively of said blade.

4. The mechanical coupler of claim 3 wherein:
    the first segment of said blade generally lies in a plane; and
    the shaft engaging region is in the form of a portion of each of the first and second strips between the bight and the first end of said blade which is displaced from the plane of the first segment to form a channel across the first and second strips, the channel having a width substantially equal to the cross sectional dimension of the shafts through the slots in the ends thereof.

5. The mechanical coupler of claim 4 wherein at least one of the first and second ends of said blade is shaped to indicate the rotational position of shafts connected by the mechanical coupler.

6. The mechanical coupler of claim 5 wherein the resilient material of said elongated blade is stainless steel.

7. A mechanical system for transmitting torque about an axis, comprising:
    first and second shafts substantially aligned with an axis, each of said first and second shafts having an end proximate an end of the other shaft, said ends of said first and second shafts having slots therein generally in a plane containing the axis; and
    a coupler connecting said first and second shafts, said coupler being formed of resilient material in the configuration of an elongated blade folded on itself along a line parallel with the axis and having a slit therethrough which extends from the line of the fold toward the ends of the blade to provide first and second folded strips respectively extending through the slots in said first and second shafts, the first and second strips being joined by a portion of said blade spaced from said first and second shafts.

8. The mechanical system of claim 7 wherein the first and second strips of said coupler are formed into a transverse channel in at least one region at which the coupler passes through the slots in said first and second shafts, the edges of the channel retaining said coupler in the slots.

9. The mechanical system of claim 8 wherein the first and second strips are joined by portions of said blade at both ends thereof.

10. The mechanical system of claim 9 wherein at least one end of the blade forming said coupler projects from the region of the channel generally in the plane of the slots and is shaped to facilitate visual observation of the rotational position of said first and second shafts.

11. The mechanical system of claim 10 wherein the slots in the ends of said first and second shafts each have a width slightly greater than twice the thickness of the blade forming said coupler.

12. The mechanical system of claim 11 wherein the resilient material of which said coupler is formed is stainless steel.

13. The mechanical system of claim 8 wherein:
    the blade of resilient material is folded along a line closer to a first end of the blade than to a second end thereof; and
    the slit intersects the first end of the blade, but does not extend to the second end thereof.

* * * * *